Patented Aug. 11, 1953

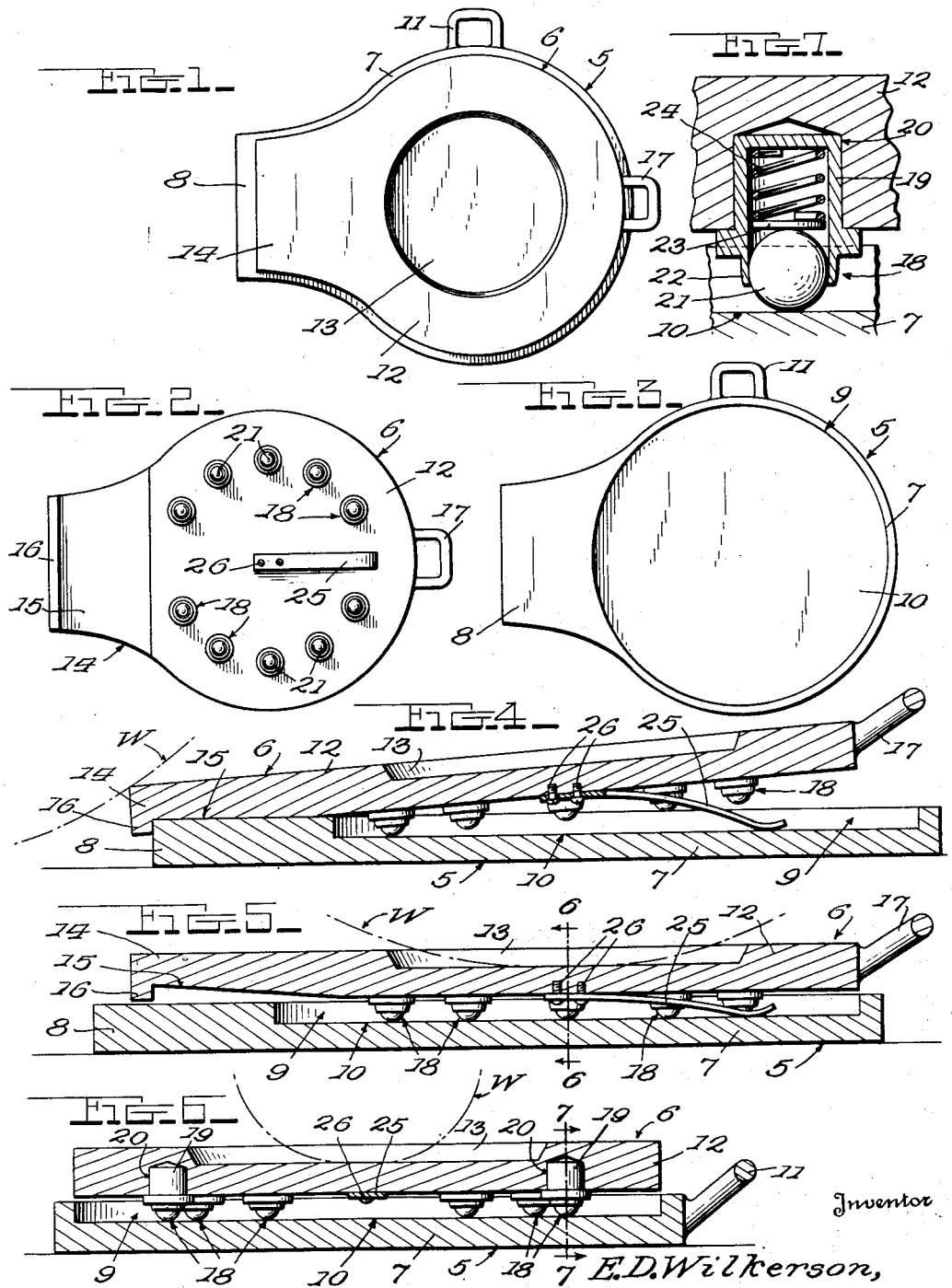

2,648,139

UNITED STATES PATENT OFFICE 2,648,139

AUTOMOBILE WHEEL SUPPORTING
TURNPLATE

Edward D. Wilkerson, Orange, N. J.

Application January 16, 1950, Serial No. 138,751

7 Claims. (Cl. 33—203)

The invention relates generally to apparatus for testing automobile wheel alignment and primarily seeks to provide a novel turn plate structure whereon to support an automobile wheel so that it can be freely turned from side to side and also move universally, forward and laterally incidental to such turning during the making of the various tests for alignment and the like.

Wheel supporting devices of the general nature stated are known but have not proven entirely satisfactory in practical use because of the complicated and expensive construction thereof, the difficulty experienced in running wheels thereonto, lack of accessibility of parts for cleansing and lubricating purposes, or the tendency for cooperating guide parts to twist and bind in use due to ingress of debris or distortion resulting from unevenness of supporting floors. A purpose of the present invention is to provide a turn plate structure which is simple and may be inexpensively manufactured and so constructed as to avoid all of the objectionable characteristics referred to.

It is well known that in establishment and maintenance of proper wheel alignment in automobiles, tests with respect to king pin inclination, camber, caster, toe-in and steering geometry are made, and that in the making of such tests a part of the procedure is to swing the wheels a certain number of degrees in both directions from the straightaway after application of suitable gaging devices. Because of the peculiar mounting of the wheels in provision of the desired camber, caster and toe-in, the support contacting surfaces thereof do not turn about fixed points but partake of a sort of eccentric or planetary movement, causing said contacting surfaces to frictionally drag over or scuff the supporting surfaces and bring about faulty readings on the gaging devices. Therefore, it is an object of the present invention to provide a novel form of turn plate whereon a wheel may be received for alignment testing purposes and which is free to move in any direction with the wheel as it is being swung about incidental to the making of tests, thereby assuring against any dragging or scuffing of tires which would result in faulty readings on the gaging devices.

In its more detailed nature the invention resides in providing a wheel supporting turn plate structure of the character stated comprising a supporting base plate having a run-up ramp extension and a turn plate receiving circular well, a turn plate having a circular portion overlying the well and supported on anti-friction bearings permitting free rotation of the turn plate as well as free planetary movement thereof over the base plate, and a run-up ramp extension overlying the base plate ramp extension and having provision for interlocking therewith as a wheel is run over the ramp extensions and onto the turn plate so as to prevent objectionable displacement of the turn plate by the wheel while rolling thereonto.

Another object of the invention is to provide a turn plate structure of the character stated wherein the turn plate is free of all connection with the supporting base so as to be readily separable from the supporting base plate without removal of any securing devices and is equipped with a plurality of ball bearing units depending therefrom for anti-friction contact with the base plate, each said unit including spring means backing up the respective ball so that each ball can support its proportionate share of the load of a supported automobile regardless of any off level condition of the base plate which may be present by reason of faulty construction, or distortion due to unevenness of a supporting floor. In other words, each spring backed ball is designed to support its proportionate share only of the weight of a car wheel resting on the plate 6. Therefore, whereas each individual spring would allow the respective cage to telescope when pressure over and above its individual calibration is imposed thereon, the combined spring cages present a resilient, adjustable surface so that they will automatically conform to any uneven base plate upon pressure of the car wheel from above.

Another object of the invention is to provide a turn plate structure of the character stated wherein the top surface of the turn plate and its ramp extension are substantially co-planar and the turn plate is tiltable about a fulcrum to lower the ramp extension thereof to a low, wheel receiving position over the ramp extension of the base plate, spring means being interposed between the plates to maintain said ramp lowered position of the upper ramp extension prior to the rolling of a wheel onto the turn plate.

With the above and other objects in view that will hereinafter appear, the nature of the invention will be more clearly understood by reference to the following detailed description, the appended claims and the several views illustrated in the accompanying drawing.

In the drawings:

Figure 1 is a plan view illustrating the improved turn plate structure.

Figure 2 is an inverted plan view of the turn plate.

Figure 3 is a top plan view of the supporting base plate.

Figure 4 is a central vertical longitudinal section through the turn plate structure shown in Figure 1, the turn plate being in the wheel receiving position and a wheel being shown about to ride onto the structure in dot and dash lines.

Figure 5 is a view similar to Figure 4 illustrating the position of the parts after the wheel has rolled onto the turn plate.

Figure 6 is a vertical cross section taken on the line 6—6 on Figure 5.

Figure 7 is an enlarged fragmentary section illustrating one of the anti-friction units, the section being taken on the line 7—7 on Figure 6.

In the example of embodiment of the invention herein disclosed, the improved turn plate structure is formed to comprise a supporting base generally designated 5, and a turn plate generally designated 6, the latter being readily removable from the base for cleaning or lubricating purposes without the necessity of removing any securing devices.

The supporting base 5 comprises a flat plate 7 which is preferably of generally circular shape with a radial ramp extension 8 at one side thereof. The plate is provided with a circular depression or turn plate receiving well 9 having a smooth circular floor 10, and a handle 11 projects radially outwardly and upwardly from one side of the plate in the manner clearly illustrated in Figures 1 and 3 of the drawings.

The turn plate 6 comprises a generally circular flat plate body 12 which is equipped with a central depression or well 13 for receiving the tire of an automobile wheel, and a ramp extension 15 extends radially from one side of the body 12 for overlying the ramp extension 8 of the supporting base in the manner clearly illustrated in Figure 1. It will be noted by reference to Figures 2, 4 and 5 of the drawings that the undersurface of the upper ramp extension 14 is upwardly and outwardly reduced or angled as at 15, this angled clearance of said plate surface serving to permit the upper ramp extension 14 to lie flush against the underlying or lower ramp extension when the turn plate is tilted in the manner illustrated in Figure 4 so as to present a relatively thin edge in position for receiving the wheel W in the manner clearly illustrated in Figure 4. This undercutting of the upper ramp extension also results in the provision of a depending hook 16 at the end extremity of the upper ramp extension which engages over the end extremity of the lower ramp extension 8 in the normal condition of the parts as illustrated in Figure 4.

The turn plate 6 also is equipped with a handle 17 which projects radially outwardly and upwardly therefrom in the manner illustrated in Figures 4 and 5 at a point circumferentially spaced from the position of the handle 11 of the supporting base, as will be apparent by reference to Figure 1. This relative placement of the handle facilitates the handling of the upper and lower plates and avoids interference of one handle with the other during manipulation of the plates.

It will be apparent by reference to Figures 2 and 4 through 6 that the upper plate or turn plate is equipped with a circle of anti-friction devices or units generally designated 18 and which depend from said plate for anti-friction contact with the upper smooth surface 10 of the supporting base within the well 9.

One of the anti-friction units is illustrated in detail in Figure 7, and each thereof includes a cage or housing 19 which is snugly fitted in a receiving bore 20 in the under surface of the turn plate 6. A ball is mounted in the lower or open end of each cage 19, being retained therein by upsetting the lower edge extremity of the cage as at 22. A follower 23 engages each ball 21 and a follower spring 24 is interposed between each follower and the upper end extremity or bottom of the ball receiving chamber of the cage.

A leaf spring 25 is interposed between the upper and lower plates for engagement at its respective ends with said plates for normally holding the upper or turn plate in the tilted position illustrated in Fig. 4, and said spring preferably is secured at one end as at 26 to the upper plate.

It will be apparent that the upper or turn plate merely rests by gravity action on the supporting base and may be readily separated therefrom whenever it is desired to clean portions of the device or lubricate the anti-friction devices. The normal condition of the parts is illustrated in Figures 1 and 2, the leaf spring 25 serving to tilt the upper plate and lower the upper ramp 14 into contact with the lower ramp, or in other words in wheel receiving position. This tilting of the upper plate is about the fulcrum provided by the two balls 21 of the anti-friction devices shown farthest to the left in Figure 2.

With the parts in the position illustrated in Figure 4, a wheel may be rolled onto the turntable structure, being received thereon in the manner indicated by the dot and dash line W in Figure 4. In this receiving position of the parts the engagement of the depending hook 16 of the upper ramp extension 14 over the outer end extremity of the lower ramp extension 8 assures against displacement of the upper plate from under the wheel as the latter comes against the same and assures that the wheel will be properly positioned on the upper plate before the plate may tilt to its proper wheel supporting position. After the turn plate has been tilted by a rolling of the wheel thereonto the hook 16 will be released, and the parts will assume the position illustrated in Figures 5 and 6, in which position the testing of wheel alignment can take place.

It is important to note that when a wheel is supported on the turn table in the manner illustrated in Figures 5 and 6 each anti-friction unit will serve as an individual support and assure against cocking and binding of the turn plate regardless of whether the supporting base may be distorted or twisted because of engagement thereof with an uneven floor support.

It is to be understood that the wheel supporting units illustrated in detail in the accompanying drawing may be used in a pair for simultaneously supporting both front wheels of an automobile while wheel alignment is being tested.

While one form of the invention has been shown for purposes of illustration, it is to be clearly understood that various changes in the details of construction and arrangement of parts may be made without departing from the spirit and scope of the invention as defined in the appended claims.

I claim:

1. An automobile wheel supporting turn plate structure comprising, a supporting base plate, a turn plate mounted on said base plate, a plurality of anti-friction units interposed between said plates for permitting free rotary and planetary movement of the turn plate over the base plate, and each said plate having a radially projecting ramp extension, said extensions being adapted to lie one over the other and serve as a run-up ramp for a wheel being rolled onto the turn plate and being equipped with interlocking means for preventing movement of the upper ramp extension relative to the lower ramp extension as a wheel is being rolled up over said ramp extensions onto the turn plate.

2. An automobile wheel supporting turn plate structure comprising, a supporting base plate, a turn plate mounted on said base plate, a plurality of anti-friction units interposed between said plates for permitting free rotary and planetary movement of the turn plate over the base plate, and each said plate having a radially projecting ramp extension, said extensions being adapted to lie one over the other and serve as a run-up ramp for a wheel being rolled onto the turn plate and being equipped with interlocking means for preventing movement of the upper ramp extension relative to the lower ramp extension as a wheel is being rolled up over said ramp extensions onto the turn plate, said plates being devoid of attachment one to the other, thereby to facilitate lifting of the turn plate from the base plate for cleaning or lubricating purposes, and a handle projecting upwardly and outwardly from each of said plates at circumferentially spaced points.

3. An automobile wheel supporting turn plate structure comprising, a supporting base plate, a turn plate mounted on said base plate, a plurality of anti-friction units interposed between said plates for permitting free rotary and planetary movement of the turn plate over the base plate, and each said plate having a radially projecting ramp extension, said extensions being adapted to lie one over the other and serve as a run-up ramp for a wheel being rolled onto the turn plate, the upper ramp extension including a depending hook engageable over the end extremity of the lower ramp extension as a wheel is being rolled up over said ramp extensions onto the turn plate.

4. An automobile wheel supporting turn plate structure comprising, a supporting base plate, a turn plate mounted on said base plate, a plurality of anti-friction units interposed between said plates for permitting free rotary and planetary movement of the turn plate over the base plate, each said plate having a radially projecting ramp extension, said extensions being adapted to lie one over the other and serve as a run-up ramp for a wheel being rolled onto the turn plate and for a wheel being rolled onto the turn plate and being equipped with interlocking means for preventing movement of the upper ramp extension relative to the lower ramp extension as a wheel is being rolled up over said ramp extensions onto the turn plate, and spring means between and engaging said plates in a manner for normally holding the turn plate tilted in an inclined wheel receiving relation on the base plate with the ramp extensions in contact and the interlocking means in effective engagement.

5. An automobile wheel supporting turn plate structure comprising, a supporting base plate, a turn plate mounted on said base plate, a plurality of anti-friction units interposed between said plates for permitting free rotary and planetary movement of the turn plate over the base plate, and each said plate having a radially projecting ramp extension, said extensions being adapted to lie one over the other and serve as a run-up ramp for a wheel being rolled onto the turn plate, the upper ramp extension including a depending hook engageable over the end extremity of the lower ramp extension as a wheel is being rolled up over said ramp extensions onto the turn plate, said plates being devoid of attachment one to the other, thereby to facilitate lifting of the turn plate from the base plate for cleaning or lubricating purposes, and spring means between and engaging said plates in a manner for normally holding the turn plate tilted in an inclined wheel receiving relation on the base plate with the ramp extensions in contact and the interlocking means in effective engagement, said upper ramp extension also having its under face bevelled to lie flush against the lower ramp extension when the turn plate is in its tilted position.

6. An automobile wheel supporting turn plate structure comprising, a supporting base plate, a turn plate mounted on said base plate and entirely free of attachment thereto so as to be entirely free to move upwardly or downwardly or laterally and readily separable from the base plate, and a plurality of anti-friction units mounted individually on one said plate and disposed in closely spaced arrangement in a large circle for anti-friction contact with the other of said plates, each said unit comprising a cage, a ball mounted and retained in said cage and projecting therefrom for contact with the opposing plate, and a load supporting compression spring constantly tending to hold the ball in its plate contacting position, each said spring being effective to carry its proportionate share only of car weight imposed upon the turn plate so that the springs can individually yield to automatically conform to any unevenness of the base plate, whereby the cage mounted balls collectively present a resilient adjustable surface and are free automatically to conform to unevenness of the base plate as car weight is imposed upon the turn plate.

7. An automobile wheel supporting turn plate structure comprising, a supporting base plate, a turn plate resting freely on said base plate so as to be entirely free to move upwardly or downwardly or laterally on the base plate, and a plurality of anti-friction units mounted individually on and depending from the turn plate for anti-friction contact with the base plate and disposed in closely spaced arrangement in a large circle, each said unit comprising a cage, a ball mounted and retained in said cage and projecting therefrom for contact with the base plate, and a load supporting compression spring constantly tending to hold the ball in its plate contacting position, each said spring being effective to carry its proportionate share only of car weight imposed upon the turn plate so that the springs can individually yield to automatically conform to any unevenness of the base plate, whereby the cage mounted balls collectively present a resilient adjustable surface and are free automatically to conform to unevenness of the base plate as car weight is imposed upon the turn plate.

E. D. WILKERSON.

References Cited in the file of this patent

UNITED STATES PATENTS

| Number | Name | Date |
| --- | --- | --- |
| 288,408 | Chew | Nov. 13, 1883 |
| 555,578 | Marden | Mar. 3, 1896 |
| 863,122 | Weber | Aug. 13, 1907 |
| 1,562,853 | Schonberger | Nov. 24, 1925 |
| 2,125,534 | Wochner | Aug. 2, 1938 |
| 2,208,063 | Wochner | July 16, 1940 |
| 2,362,629 | Griffith et al. | Nov. 14, 1944 |